US011208215B2

(12) United States Patent
Martinez et al.

(10) Patent No.: US 11,208,215 B2
(45) Date of Patent: Dec. 28, 2021

(54) METHOD FOR MOUNTING AN AIRCRAFT PYLON

(71) Applicant: Airbus Operations S.A.S., Toulouse (FR)

(72) Inventors: Pascal Martinez, Toulouse (FR); Olivier Pautis, Toulouse (FR)

(73) Assignee: Airbus Operations S.A.S.

( * ) Notice: Subject to any disclaimer, the term of this patent is extended or adjusted under 35 U.S.C. 154(b) by 301 days.

(21) Appl. No.: 16/560,023

(22) Filed: Sep. 4, 2019

(65) Prior Publication Data

US 2020/0087000 A1 Mar. 19, 2020

(30) Foreign Application Priority Data

Sep. 19, 2018 (FR) ...................................... 18 58446

(51) Int. Cl.
*B64D 27/26* (2006.01)
*B64D 27/18* (2006.01)
*B64D 27/12* (2006.01)
*B64D 27/06* (2006.01)

(52) U.S. Cl.
CPC ............. *B64D 27/26* (2013.01); *B64D 27/18* (2013.01); *B64D 27/06* (2013.01); *B64D 27/12* (2013.01); *B64D 2027/262* (2013.01)

(58) Field of Classification Search
CPC ........ B64D 27/26; B64D 27/18; B64D 27/12; B64D 27/06; B64D 2027/262; F05D 2240/90
See application file for complete search history.

(56) References Cited

U.S. PATENT DOCUMENTS

| 3,831,888 | A | 8/1974 | Baker et al. |
| 10,711,696 | B2 * | 7/2020 | Buckus ..................... F02C 7/20 |
| 2010/0193627 | A1 | 8/2010 | Lafont |
| 2015/0013142 | A1 * | 1/2015 | West ..................... B64D 27/26 |
| | | | 29/525.08 |
| 2018/0178923 | A1 | 6/2018 | Petrissans-Lloveras et al. |

FOREIGN PATENT DOCUMENTS

FR 2891247 A1 3/2007

* cited by examiner

*Primary Examiner* — Victoria E Frunzi
*Assistant Examiner* — Eric Acosta
(74) *Attorney, Agent, or Firm* — Lerner, David, Littenberg, Krumholz & Mentlik, LLP

(57) ABSTRACT

A method for mounting an aircraft pylon connected to a wing includes: a step of pre-positioning first and second contact surfaces respectively provided on the wing and the pylon, a step of installing and tightening temporary connection elements, so as to keep the first and second contact surfaces clamped against one another, a step of installing and expanding at least one radially expandable element in at least one pair of first and second receptacles respectively provided on the wing and the pylon, a step of installing and tightening final connection elements connecting the pylon and the wing in the mounted state, a step of removing the radially expandable element(s) and the temporary connection elements, and of installing the remaining final connection elements and shear pin(s).

10 Claims, 4 Drawing Sheets

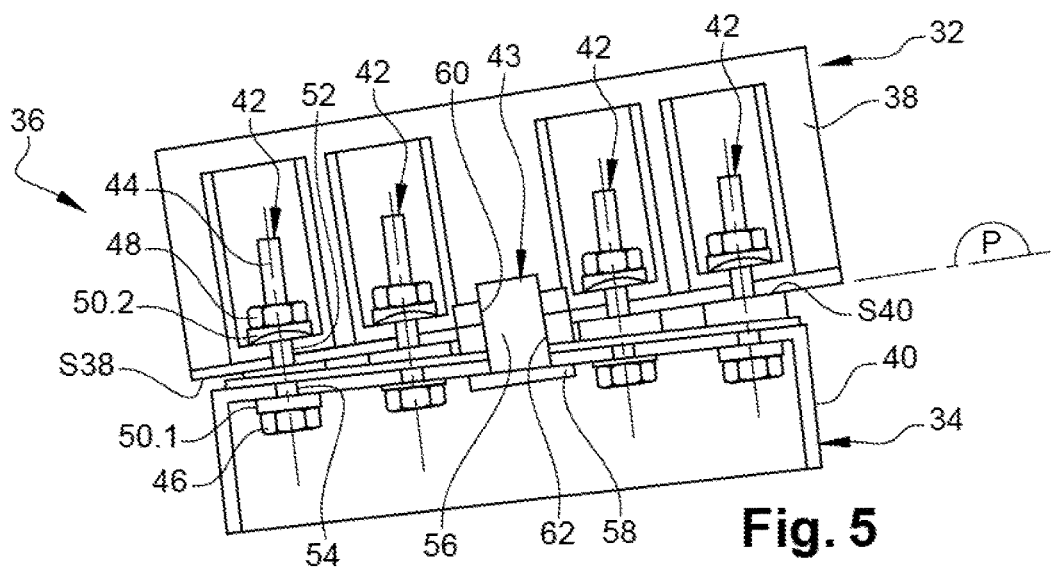

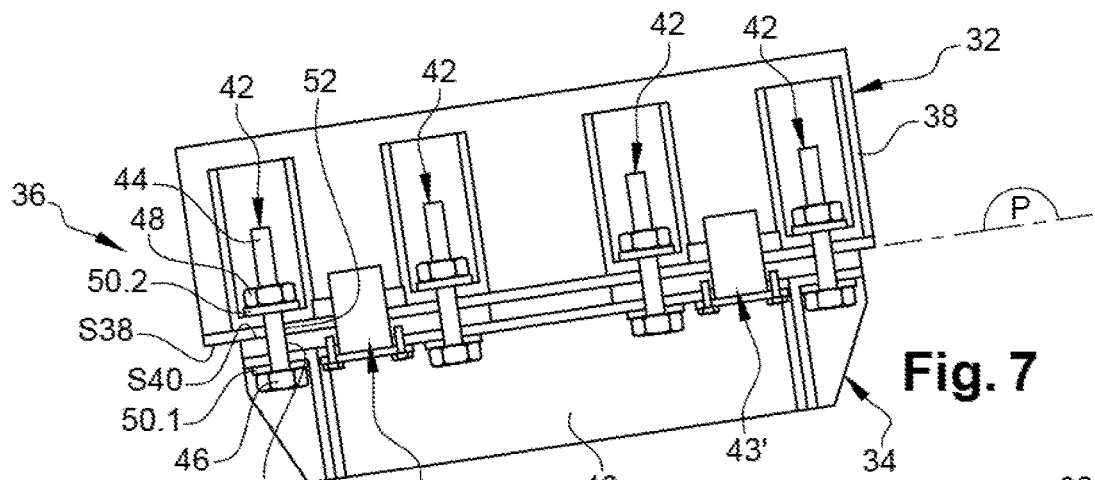
Fig. 7
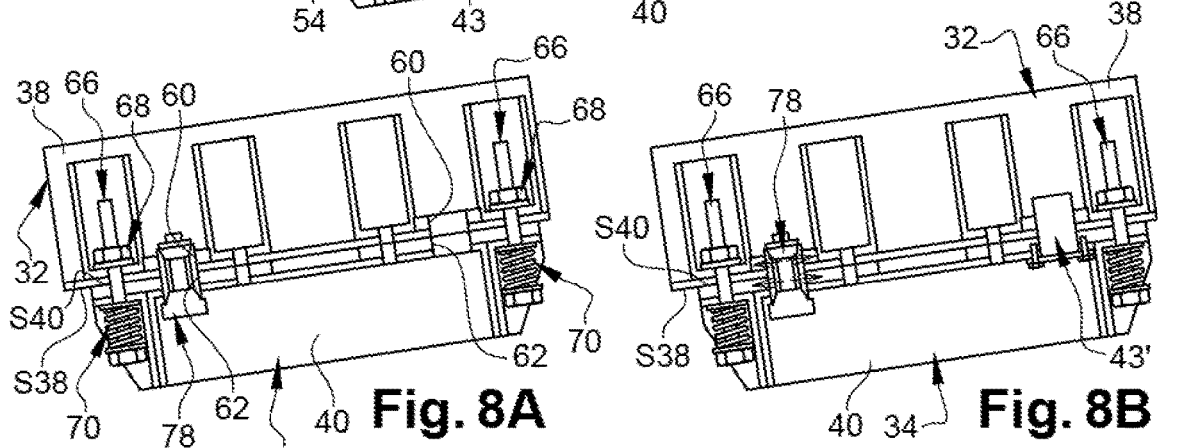
Fig. 8A  Fig. 8B
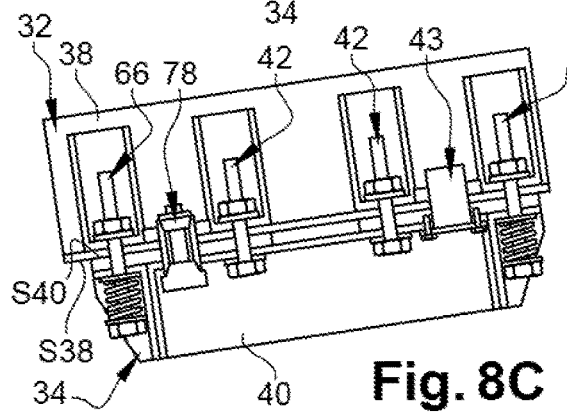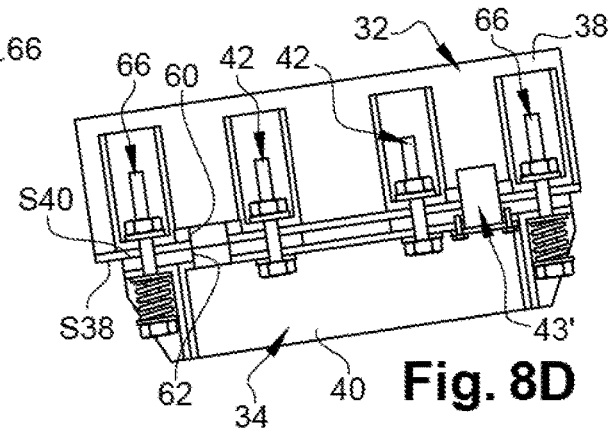
Fig. 8C  Fig. 8D
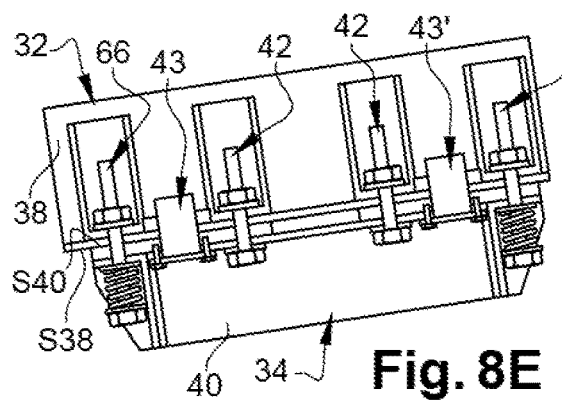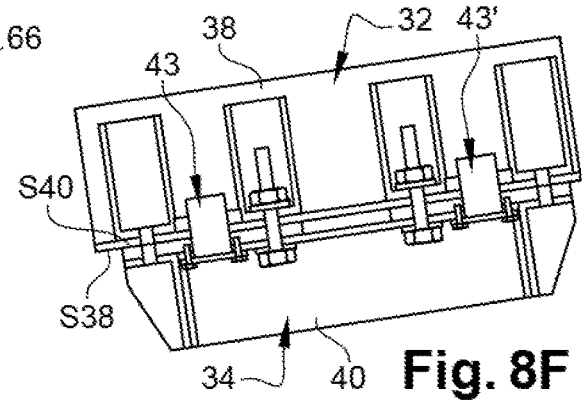
Fig. 8E  Fig. 8F

METHOD FOR MOUNTING AN AIRCRAFT PYLON

FIELD OF THE INVENTION

The present application relates to a method for mounting an aircraft pylon.

BACKGROUND OF THE INVENTION

According to a configuration shown in FIGS. 1 and 2, an aircraft 10 comprises multiple propulsion units 12 positioned below the wing 14 of the aircraft 10.

A propulsion unit 12 comprises an engine 16, a nacelle (not shown in FIG. 2) positioned around the engine 16, and a pylon 18 that provides the connection between the engine 16 and the wing 14. The pylon 18 comprises a primary structure 20 which is connected to the engine 16 by an engine attachment 22 and to the wing 14 by a wing attachment 24.

For the present application, a longitudinal direction X is a direction parallel to the engine axis A16. A horizontal transverse direction Y is a horizontal direction perpendicular to the engine axis A16. A vertical transverse direction Z is a vertical direction perpendicular to the engine axis A16. A vertical longitudinal plane is a plane parallel to the vertical direction and the longitudinal direction X.

The terms "front" and "rear" ("Av" and "Ar" respectively) refer to a direction of advance of the aircraft 10 that takes place as a consequence of the thrust produced by the propulsion units 12, this direction being represented by the arrow 15 in FIG. 1.

According to one configuration, shown in FIG. 2, the engine attachment 22 comprises a front engine attachment 22.1, a rear engine attachment 22.2 and thrust rods 22.3 arranged on either side of the engine 16. The wing attachment 24 comprises a front wing attachment 24.1 and a rear wing attachment 24.2.

According to a first configuration, the front wing attachment comprises two simple shackles arranged in vertical longitudinal planes, a first end of each shackle being connected by a connection axis to a clevis secured to the primary structure 20 of the pylon 18 and a second end of each shackle being connected by a connection axis to a clevis secured to the wing 14. According to this first configuration, the shackles and/or the clevises may be configured so as to compensate for the curvature of the wing such that the connection axes are approximately horizontal in order to make them easier to mount.

This first configuration has the drawback of being relatively extensive in the vertical direction.

According to a second configuration, shown in FIGS. 3 and 4, a front wing attachment 24.1 comprises at least one first contact surface 26 secured to the wing 14, at least one second contact surface 28 secured to the primary structure 20 of the pylon 18 and a plurality of connection elements 30, for example bolts, for keeping the first and second contact surfaces 26, 28 clamped against one another and to provide the connection between the pylon 18 and the wing 14. Given the curvature of the wing, the plane of contact of the first and second contact surfaces 26, 28 is not horizontal but inclined along a plane that is essentially tangential to a lower panel of the wing 14, and the connection elements 30 are also inclined.

This second configuration serves to reduce the bulk along the vertical direction of the front wing attachment 24.1. However, it proves difficult to position the pylon relative to the wing given the inclination of the plane of contact of the first and second contact surfaces 26, 28.

BRIEF SUMMARY OF THE INVENTION

Aspects of the present invention may remedy some or all of these drawbacks of the prior art.

An aspect of the invention relates to a method for mounting an aircraft pylon connected to a wing by at least one front wing attachment comprising:
- at least one first plate secured to the wing which has a first contact surface,
- at least one second plate secured to the pylon which has a second contact surface,
- a plurality of final connection elements which, when the pylon is mounted, connect the first and second plates by holding the first and second contact surfaces against one another at a plane of contact that is inclined for each final connection element, the first and second plates respectively comprising a pair of first and second through-holes,
- at least one shear pin which, when the pylon is mounted, straddles a pair of first and second receptacles which are respectively provided in the first and second plates and which each have a cross section identical to that of the shear pin.

The mounting method is characterized in that it comprises:
- a step of pre-positioning the first and second contact surfaces, such that the first and second contact surfaces are approximately parallel and close to or in contact with one another, and of approximately pre-aligning the first and second through-holes of each pair of first and second through-holes and pre-aligning the first and second receptacles of each pair of first and second receptacles,
- a step of installing and tightening temporary connection elements in certain pairs of first and second through-holes, so as to keep the first and second contact surfaces clamped against one another,
- a step of installing and expanding at least one radially expandable element in at least one pair of first and second receptacles,
- a step of installing and tightening final connection elements in at least some of the pairs of first and second through-holes that are not occupied by the temporary connection elements,
- steps of removing the radially expandable element(s) and installing the shear pin(s), and of removing the temporary connection elements and installing the final connection elements.

This method for mounting an aircraft pylon makes it possible to simplify the implementation thereof.

According to another feature, each temporary connection element comprises at least one compression element positioned below the pylon, the step of tightening the temporary connection elements serving to obtain a compression force of each compression element, the compression force of each compression element of the temporary connection elements and the radially expandable element being configured so as to allow the first and second contact surfaces to slide with respect to one another during the step of expanding the radially expandable element.

Moreover, the compression force of each compression element of the temporary connection elements and the radially expandable element are configured so as to keep the first and second plates immobile with respect to one another when the radially expandable element is not expanded.

According to another feature, the step of pre-positioning the first and second contact surfaces is carried out using a lifting system configured to tilt then lift the pylon.

According to one mode of operation, the lifting system comprises at least two strands and it is configured to occupy a so-called connected and loaded state in which the strands are taut, with the lifting system supporting the pylon; a so-called connected and unloaded state in which the strands are slack, with the lifting system not supporting the pylon, and a so-called detached state in which the pylon is detached from the lifting system.

The lifting system passes from the connected and loaded state to the connected and unloaded state after the step of tightening the temporary connection elements.

According to another feature, the radially expandable element is an expandable ring configured to occupy a retracted state in which the expandable ring has a cross section allowing it to be inserted into the pair of first and second receptacles and an expanded state in which the expandable ring has a cross section equal to or greater than that of the first and second receptacles.

According to another feature, each radially expandable element is removed and replaced with a shear pin prior to removal of the temporary connection elements.

According to one mode of operation, a shear pin is positioned in each pair of first and second receptacles not occupied by a radially expandable element prior to removal of the radially expandable element(s).

According to one embodiment, the wing attachment comprises, when the pylon is mounted, at least one front shear pin arranged in a first transverse plane and at least one rear shear pin arranged in a second transverse plane which is offset to the rear relative to the first transverse plane. In this case, the mounting method is characterized in that a first radially expandable element is installed in a pair of first and second receptacles arranged in the first transverse plane, and in that a second radially expandable element is installed in a pair of first and second receptacles arranged in the second transverse plane.

BRIEF DESCRIPTION OF THE DRAWINGS

Other features and advantages will emerge from the following description of the invention, which description is given solely by way of example, with reference to the appended drawings in which:

FIG. 5 is a schematic representation along a transverse section of a front wing attachment, illustrating a first embodiment of the invention in a final assembly state, FIGS. 6A to 6I are schematic representations along a transverse section of the front wing attachment shown in FIG. 5, illustrating the various intermediate and chronological steps of a method for mounting an aircraft pylon, FIG. 7 is a schematic representation along a transverse section of a front wing attachment, illustrating a second embodiment of the invention in a final assembly state, and FIGS. 8A to 8F are schematic representations along a transverse section of the front wing attachment shown in FIG. 7, illustrating some intermediate and chronological steps of a method for mounting an aircraft pylon.

DETAILED DESCRIPTION

Figure 1:
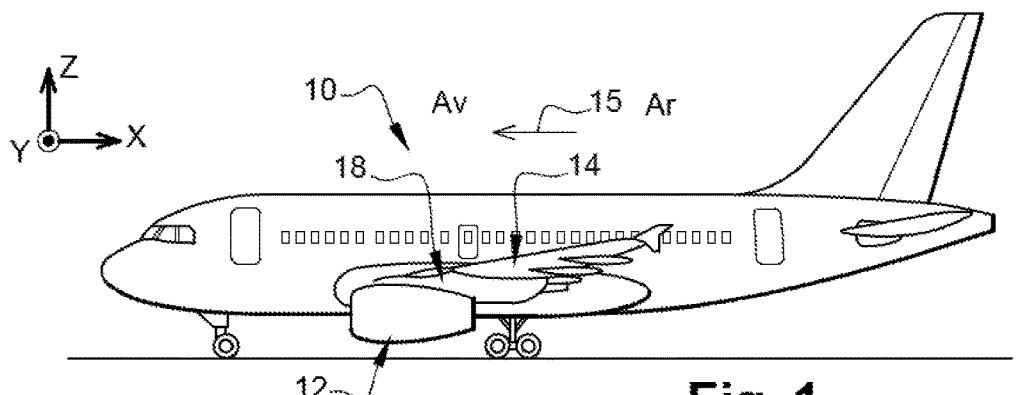
FIG. 1 is a side view of an aircraft.
Figure 2:
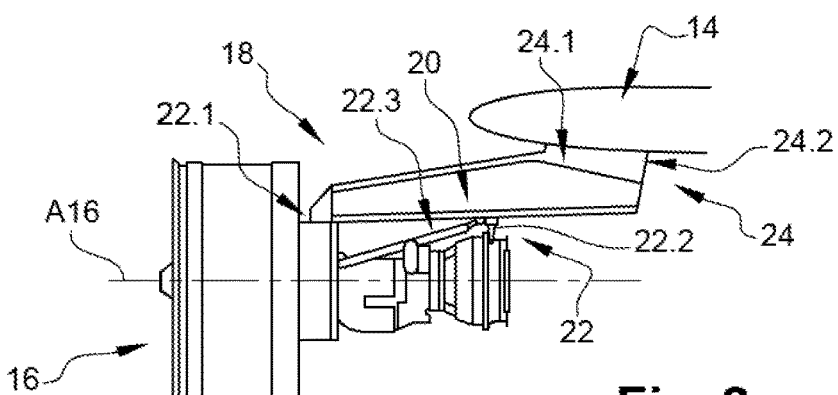
FIG. 2 is a lateral schematic representation of a propulsion unit (the nacelle not being depicted), illustrating one prior art configuration.
Figure 3:
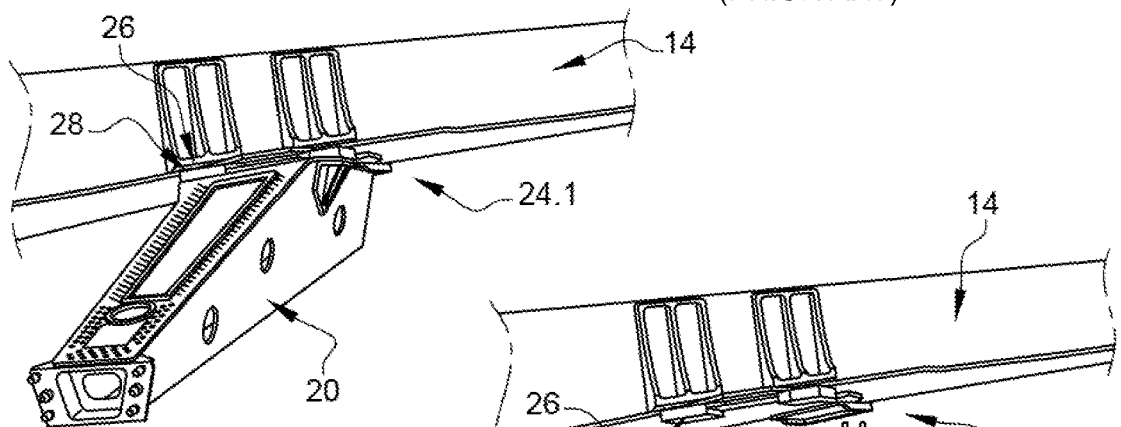
FIG. 3 is a perspective view of an aircraft pylon connected to a wing by a wing attachment, illustrating embodiment prior art configuration.
Figure 4:
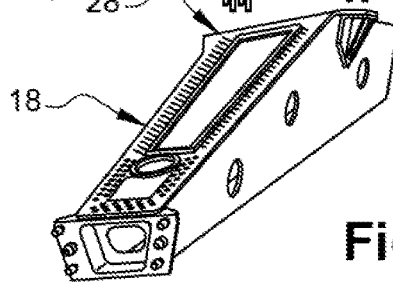
FIG. 4 is a perspective view of the pylon shown in FIG. 3, in the unmounted state.

FIGS. 5 and 7 depict a wing 32, a pylon 34 connected to the wing 32 by at least one front wing attachment 36.

According to one embodiment, the front wing attachment 36 comprises at least one first plate 38 secured to the wing 32, at least one second plate 40 secured to the pylon 34, a plurality of final connection elements 42 which, when the pylon is mounted, connect the first and second plates 38, 40, and at least one shear pin 43.

According to one configuration, the first plate 38 is a fitting integrated into the wing 32, and the second plate 40 is a part of the primary structure of the pylon 34.

The first plate 38 comprises at least one first contact surface S38. In addition, the second plate 40 comprises at least one second contact surface S40, the first and second contact surfaces S38, S40 being clamped against one another at a contact plane P when the pylon 34 is fastened to the wing 32. The contact plane P is not horizontal but inclined with respect to a horizontal plane corresponding to a plane essentially tangential to a lower panel of the wing 32. By way of example, the contact plane P forms an angle of the order of 10° with a horizontal plane.

According to one embodiment, each final connection element 42 is a bolt comprising a shank 44 that is at least partially threaded and that has, at one of its ends, a head 46, and a nut 48 configured to be screwed onto the shank 44. According to one orientation, in operation, the head 46 is clamped against the second plate 40 and the nut 48 is clamped against the first plate 38. The final connection element 42 may also comprise a first washer 50.1 interposed between the head 46 and the second plate 40 and/or a second washer 50.2 interposed between the nut 48 and the first plate 38. According to one embodiment, shown in FIG. 7, the first and second washers 50.1, 50.2 are flat. According to another embodiment, shown in FIG. 5, at least one of the first and second washers 50.1, 50.2 is spherical.

According to a simplified version, each final connection element 42 comprises an at least partially threaded shank 44 and at least one nut 48 that is configured to be screwed onto the shank 44.

For each final connection element 42, the first plate 38 comprises a first through-hole 52 having a diameter greater than that of the shank 44 and an axis A52 (shown in FIG. 6A) perpendicular to the first contact surface S38 and to the contact plane P in operation. In addition, the second plate 40 comprises a second through-hole 54 having a diameter greater than that of the shank 44 and an axis A54 (shown in FIG. 6A) perpendicular to the second contact surface S40 and to the contact plane P in operation. When the pylon 34 is fastened to the wing 32, for each final connection element 42, the first and second through-holes 52, 54 are arranged one in the extension of the other and the axes A52 and A54 coincide.

According to one embodiment, shown in particular in FIG. 5, a shear pin 43 comprises a cylindrical body 56 which has a section S and a head 58 positioned at one end of the body 56, coaxial with the body 56 and having a cross section larger than that of the body 56. The body 56 has a sufficient length (dimension considered along the axis of revolution of the body 56) allowing it to straddle the first and second plates 38, 40 when the pylon is mounted.

For each shear pin 43, the first plate 38 comprises a first receptacle 60 having a section identical to the section S of the body 56 of the shear pin 43 and an axis A60 (shown in FIG. 6A) perpendicular to the first contact surface S38 and to the contact plane P in operation. The second plate 40 comprises a second receptacle 62 having a section identical to the section S of the body 56 of the shear pin 43 and an axis A62 (shown in FIG. 6A) perpendicular to the second contact surface S40 and to the contact plane P in operation. When the pylon 34 is fastened to the wing 32, for each shear pin 43, the first and second receptacles 60, 62 are arranged one in the extension of the other and the axes A60 and A62 coincide.

According to a first embodiment, shown in FIG. 5, the front wing attachment 36 comprises a single shear pin 43. According to a second embodiment, shown in FIG. 7, the front wing attachment 36 comprises multiple shear pins 43, for example first and second front shear pins 43, 43' arranged in a first transverse plane and a third, rear shear pin (not shown) arranged in a second transverse plane which is offset to the rear relative to the first transverse plane. Of course, the invention is not restricted to these embodiments.

According to a first aspect, a method for mounting the pylon 34 comprises:

A first step of positioning the pylon 34 below the wing 32, essentially vertically below its position when fastened to the wing 32, as shown in FIG. 6A. During this first step, the pylon 34 can rest on the ground or be hoisted in a purely vertical direction so as to be closer to the wing 32.

A second step of tilting the pylon 34 such that the second contact surface S40 of the second plate 40 is oriented parallel to the first contact surface S38 of the first plate 38, as shown in FIG. 6B. During this second step, the pylon 34 is tilted in a tangential direction with respect to a lower panel of the wing 32. By way of example, the pylon 34 is tilted by approximately 10°.

A third step of bringing together the first and second contact surfaces S38, S40 of the first and second plates 38, 40, such that the latter are approximately parallel and close to or in contact with one another, as shown in FIG. 6C, and of approximately pre-aligning the first and second through-holes of each pair of first and second through-holes and pre-aligning the first and second receptacles of each pair of first and second receptacles.

At the end of this third bringing-together step, the first and second through-holes 52, 54 and the first and second receptacles 60, 62 are aligned non-methodically and approximately (by eye).

A lifting system 64 can be used for carrying out the second and third steps, that is to say tilting then lifting the pylon 34. This lifting system 64 comprises at least two strands 64.1 and 64.2 that are connected directly or indirectly to the pylon 34. According to one mode of operation, the lifting system 64 is configured to occupy a so-called connected and loaded state in which the strands 64.1, 64.2 are taut, with the lifting system 64 supporting the pylon 34, a so-called connected and unloaded state in which the strands 64.1, 64.2 are slack, with the lifting system 64 not supporting the pylon 34, and a so-called detached state in which the pylon 34 is detached from the lifting system 64.

As shown in FIG. 6D, the method for mounting the pylon 34 comprises a fourth step of installing temporary connection elements 66, which are configured to take at least part of the weight of the pylon 34, in at least certain pairs of first and second through-holes 52, 54. Each temporary connection element 66 comprises a bolt 68, which may be identical to that of a final connection element 42, and at least one compression element 70 (spring, elastic washer or other) positioned below the pylon 34. According to one embodiment, the bolt 68 comprises a shank 72 which is at least partially threaded and which has at one of its ends a head 74, and a nut 76 that is configured to be screwed onto the shank 72, and possibly at least one washer interposed between the nut 76 and the first plate 38 and/or between the head 74 and the second plate 40. Each compression element 70 is a spring interposed between the head 74 of the bolt 68 and the second plate 40.

The number and distribution of the temporary connection elements 66 are determined so as to ensure even distribution of the contact forces between the first and second contact surfaces S38, S40. In all cases, certain pairs of first and second through-holes 52, 54 are free and not occupied by the temporary connection elements 66. During the second, third and fourth steps, the lifting system 64 is in the connected and loaded state.

Figure 6E:
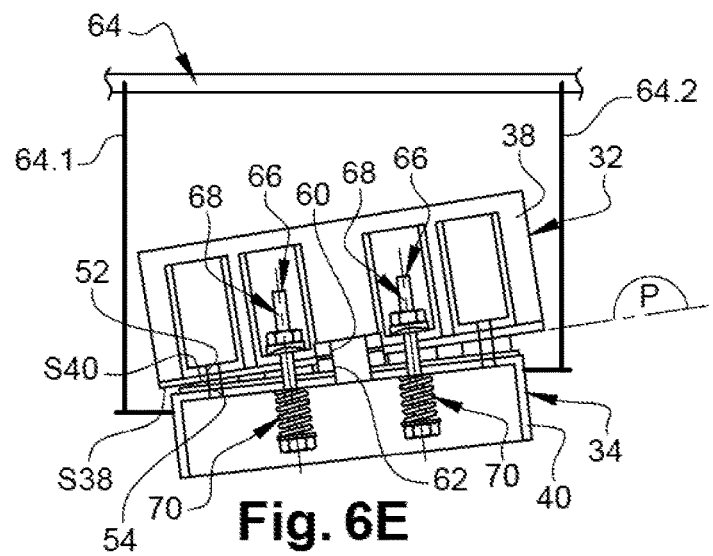

The method of mounting the pylon 34 comprises a fifth step of tightening the temporary connection elements 66 so as to compress their compression elements 70, as shown in FIG. 6E. The lifting system 64 passes from the connected and loaded state to the connected and unloaded state after the step of tightening the temporary connection elements 66.

The compressive force is determined such that the first and second contact surfaces S38, S40 are in contact at the contact plane P and such that the compression forces of the first and second contact surfaces S38, S40 against one another are such that the first and second contact surfaces S38, S40 cannot slide with respect to one another in the contact plane P when no force acts parallel to the contact plane P, and can slide with respect to one another when at least one force acts parallel to the contact plane P.

Figure 6F:
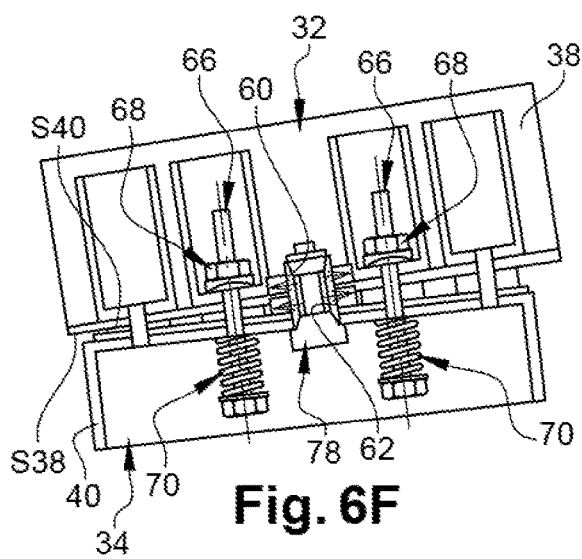

The method for mounting the pylon 34 comprises a sixth step of installing a radially expandable element 78 in at least one pair of first and second receptacles 60, 62 so as to straddle said pair of receptacles, as shown in FIG. 6F, and of radially expanding said radially expandable element 78. According to one configuration, the radially expandable element 78 is an expandable ring configured to occupy a retracted state in which the expandable ring has a cross section allowing it to be inserted into a pair of first and second receptacles 60, 62 even if the latter are not perfectly aligned, and an expanded state in which the expandable ring has a cross section equal to or greater than that of the first and second receptacles 60, 62.

The compression force of each compression element 70 of the temporary connection elements 66 and the radially expandable element 78 are configured so as to allow the first and second contact surfaces S38, S40 to slide with respect to one another during the step of expanding the radially expandable element 78, and so as to keep the first and second plates 38, 40 immobile with respect to one another when the radially expandable element 78 is not expanded.

Figure 6G:
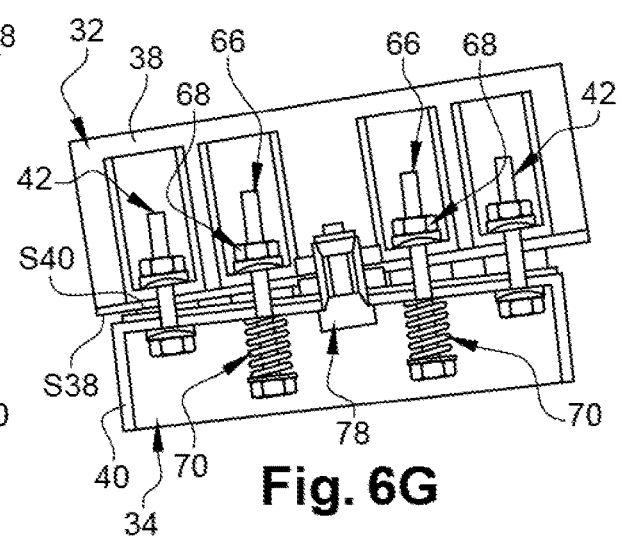

After expanding the radially expandable element 78 to reach a cross section identical to those of the first and second receptacles 60, 62, for each final connection element 42, the first and second through-holes 52, 54 are aligned, as shown in FIG. 6G.

The method for mounting the pylon 34 comprises a seventh step of installing final connection elements 42 in those pairs of first and second through-holes 52, 54 which are not occupied by the temporary connection elements 66. These final connection elements 42 are tightened so as to prevent any sliding of the first and second contact surfaces S38, S40 with respect to one another.

Figure 6H:
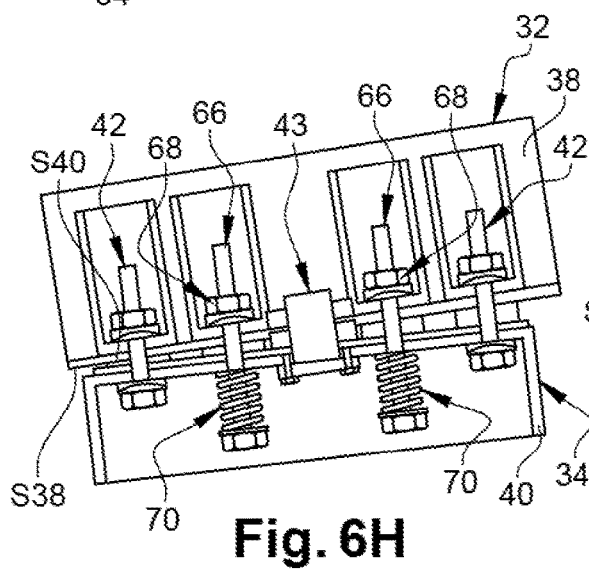

In an eighth step, the radially expandable element 78 is removed and replaced with a shear pin 43, as shown in FIG. 6H. During the fifth, sixth, seventh and eighth steps, the lifting system 64 is in the connected and unloaded state. At the end of the eighth step, the pylon 34 is detached from the lifting system 64.

Figure 6I:
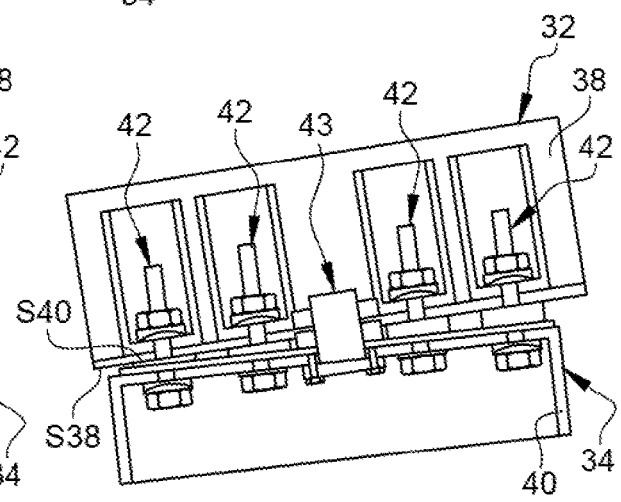

During a ninth step, the remaining temporary connection elements 66 are removed and replaced with final connection elements 42, as shown in FIG. 6I. All of the final connection elements 42 are then given a final tightening depending on the desired tensile forces for each one.

As a variant, the pylon 34 could be detached from the lifting system 64 once all of the shear pins 43 and all of the final connection elements 42 have been installed. Similarly, replacing the temporary connection elements 66 with final connection elements 42 could be done before replacing the radially expandable element(s) 78 with the shear pin(s) 43.

The mounting method according to the first aspect is especially suitable when the wing attachment 36 comprises just one shear pin 43, as shown in FIG. 5.

Certain steps of a method for mounting a pylon whose wing attachment 36 comprises multiple shear pins 43, as shown in FIG. 7, are described in FIGS. 8A to 8F.

The wing attachment 36 comprises at least one front shear pin 43 arranged in a first transverse plane and at least one rear shear pin arranged in a second transverse plane which is offset to the rear relative to the first transverse plane.

The five first steps, which serve to bring the first and second contact surfaces S38, S40 closer together, of installing and tightening the temporary connection elements 66, are identical to those of the first aspect. These temporary connection elements 66 are positioned at the front and at the rear of the front wing attachment 36. At the end of this fifth step, the pylon 34 is detached from the lifting system 64.

A sixth step involves installing two radially expandable elements 78, a first radially expandable element 78 in a pair of first and second receptacles 60, 62 arranged in the first transverse plane (shown in FIG. 8A) and a second radially expandable element in a pair of first and second receptacles 60, 62 arranged in the second transverse plane (not shown). After expanding the radially expandable elements 78 to reach a cross section identical to those of the first and second receptacles 60, 62, for each final connection element 42, the first and second through-holes 52, 54 are aligned, as shown in FIG. 8B.

A seventh step involves positioning a shear pin 43 in the pair of first and second receptacles 60, 62 arranged in the first transverse plane, these not being occupied by one of the radially expandable elements 78, as shown in FIG. 8B.

An eighth step, shown in FIG. 8C, involves installing final connection elements 42 in those pairs of first and second through-holes 52, 54 that are not occupied by the temporary connection elements 66. These final connection elements 42 are tightened so as to prevent any sliding of the first and second contact surfaces S38, S40 with respect to one another. One (or more) shear pin(s) 43 is (or are) positioned in that (or those) pair(s) of first and second receptacles not occupied by the radially expandable element(s) 78.

In a ninth step, shown in FIGS. 8D and 8E, the radially expandable elements 78 are removed and replaced with shear pins 43. Finally, in a tenth step, shown in FIGS. 8F and 7, the temporary connection elements 66 are removed and replaced with final connection elements 42. All of the final connection elements 42 are then given a final tightening depending on the desired tensile forces for each one.

Whatever the operating mode, the method for mounting a pylon comprises a step of pre-positioning the first and second contact surfaces S38, S40, a step of installing and tightening temporary connection elements 66 in certain pairs of first and second through-holes 52, 54, a step of installing and expanding at least one radially expandable element 78 in at least one pair of first and second receptacles 60, 62, a step of installing and tightening final connection elements 42 in at least certain pairs of first and second through-holes 52, 54 that are not occupied by the temporary connection elements 66 so as to prevent the first and second contact surfaces S38, S40 from sliding relative to one another, steps of removing the radially expandable element(s) 78 and the temporary connection elements 66, and of installing the remaining final connection elements 42 and shear pin(s) 43.

The radially expandable element(s) 78 is/are removed and replaced with the shear pin(s) prior to removal of the temporary connection elements 66 in order to reduce the risk of sliding between the first and second contact surfaces S38, S40 during removal of the temporary connection elements 66.

This method for mounting the pylon makes it possible to simplify the implementation thereof.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for mounting an aircraft pylon connected to a wing by at least one front wing attachment, comprising: at least one first plate secured to the wing having a first contact surface; at least one second plate secured to the pylon having a second contact surface; a plurality of final connection elements which, when the pylon is mounted, connect the first and second plates by holding the first and second contact surfaces against one another at a plane of contact that is inclined for each final connection element, the first and second plates respectively comprising a pair of first and second through-holes; at least one shear pin which, when the pylon is mounted, straddles a pair of first and second receptacles which are respectively provided in the first and second plates and which each have a cross section identical to that of the shear pin, wherein the mounting method comprises: pre-positioning the first and second contact surfaces, such that the first and second contact surfaces are approximately parallel and close to or in contact with one another, and of approximately pre-aligning the first and second through-holes of each pair of first and second through-holes and pre-aligning the first and second receptacles of each pair of first and second receptacles; installing and tightening temporary connection elements in certain pairs of first and second through-holes, so as to keep the first and second contact surfaces clamped against one another; installing and expanding at least one radially expandable element in at least one pair of first and second receptacles;

installing and tightening final connection elements in at least some of the pairs of first and second through-holes that are not occupied by the temporary connection elements; removing the at least one radially expandable element and installing the at least one shear pin, and removing the temporary connection elements and installing the final connection elements.

2. The method for mounting the aircraft pylon according to claim 1, wherein each temporary connection element comprises at least one compression element positioned below the pylon, the step of tightening the temporary connection elements serving to obtain a compression force of each compression element, the compression force of each compression element of the temporary connection elements and the radially expandable element being configured so as to allow the first and second contact surfaces to slide with respect to one another during the step of expanding the radially expandable element.

3. The method for mounting the aircraft pylon according to claim 2, wherein the compression force of each compression element of the temporary connection elements and the radially expandable element are configured so as to keep the first and second plates immobile with respect to one another when the radially expandable element is not expanded.

4. The method for mounting the aircraft pylon according to claim 1, wherein the step of pre-positioning the first and second contact surfaces is carried out using a lifting system configured to tilt then lift the pylon.

5. The method for mounting the aircraft pylon according to claim 4, wherein the lifting system comprises at least two strands and wherein the lifting system is configured to occupy a connected and loaded state in which the strands are taut, with the lifting system supporting the pylon, a connected and unloaded state in which the strands are slack, with the lifting system not supporting the pylon, and a detached state in which the pylon is detached from the lifting system.

6. The method for mounting the aircraft pylon according to claim 5, wherein the lifting system passes from the connected and loaded state to the connected and unloaded state after the step of tightening the temporary connection elements.

7. The method for mounting the aircraft pylon according to claim 1, wherein the at least one radially expandable element is an expandable ring configured to occupy a retracted state in which the expandable ring has a cross section allowing it to be inserted into the pair of first and second receptacles and an expanded state in which the expandable ring has a cross section equal to or greater than that of the first and second receptacles.

8. The method for mounting the aircraft pylon according to claim 1, wherein each of the at least one radially expandable element is removed and replaced with one of the at least one shear pin prior to removal of the temporary connection elements.

9. The method for mounting the aircraft pylon according to claim 8, wherein one of the at least one shear pin is positioned in each pair of first and second receptacles not occupied by a radially expandable element prior to removal of the at least one radially expandable element.

10. The method for mounting the aircraft pylon according to claim 1, wherein the wing attachment comprises, when the pylon is mounted, at least one front shear pin of the at least one shear pin is arranged in a first transverse plane and at least one rear shear pin of the at least one shear pin is arranged in a second transverse plane which is offset to the rear relative to the first transverse plane, wherein a first of the at least one radially expandable element is installed in a pair of first and second receptacles arranged in the first transverse plane, and wherein a second of the at least one radially expandable element is installed in a pair of first and second receptacles arranged in the second transverse plane.

* * * * *